United States Patent [19]

Cooper

[11] E Re. 30,779

[45] Reissued Oct. 20, 1981

[54] FILTER ASSEMBLY WITH REPLACEABLE FILTER ELEMENT

[75] Inventor: Roydon B. Cooper, Locust Valley, N.Y.

[73] Assignee: Pall Corporation, Glen Cove, N.Y.

[21] Appl. No.: 143,227

[22] Filed: Apr. 24, 1980

Related U.S. Patent Documents

Reissue of:

[64] Patent No.: 4,133,763
Issued: Jan. 9, 1979
Appl. No.: 856,959
Filed: Dec. 5, 1977

[51] Int. Cl.[3] ..... B01D 27/04

[52] U.S. Cl. ..... 210/232; 210/441; 210/457

[58] Field of Search ..... 210/232, 234, 236, 435, 210/441, 446, 450, 455, 457

[56] References Cited

U.S. PATENT DOCUMENTS

| | | | |
|---|---|---|---|
| 2,540,134 | 2/1951 | Nelson | 210/457 X |
| 3,237,770 | 3/1966 | Humbert, Jr. | 210/232 X |
| 3,282,429 | 11/1966 | Wood et al. | 210/232 X |
| 3,321,085 | 5/1967 | Moorhead | 210/232 |
| 3,908,693 | 9/1975 | Cooper | 210/130 X |

FOREIGN PATENT DOCUMENTS 2036302 1/1972 Fed. Rep. of Germany .

*Primary Examiner*—William A. Cuchlinski, Jr.

[57] ABSTRACT

A filter assembly is provided having a filter chamber and a filter element therein that is replaceable without contamination of filtered fluid with unfiltered fluid even though the filter chamber is not emptied of unfiltered fluid comprising, in combination, a filter housing; a filter chamber in the housing; an inlet for unfiltered fluid and an outlet for filtered fluid in the housing; a filter element removably disposed in the filter chamber across the line of fluid flow from the inlet to the outlet so that fluid flow from the inlet to the outlet normally proceeds through the filter; a weir spaced from and downstream of the filter element, compelling filtered fluid from the filter flowing towards the outlet to proceed upwardly through the space between the weir and the filter and then by overflow across the weir; and a weir follower operatively associated with the base of the filter element and movable along the weir in fluid-tight relation to the base and the weir, to carry filtered fluid in the space between the weir and the filter element on the downstream side of the filter element to the top of the weir while a used filter element is being removed, and to displace unfiltered fluid in the filter chamber from contact with the downstream side of a clean filter element while the clean filter element is being installed. The filter assembly is particularly suited for use as a return line filter mounted in a tank.

28 Claims, 10 Drawing Figures

FILTER ASSEMBLY WITH REPLACEABLE FILTER ELEMENT

Matter enclosed in heavy brackets [ ] appears in the original patent but forms no part of this reissue specification; matter printed in italics indicates the additions made by reissue.

Filter assemblies are normally so constructed that it is possible to remove and replace a filter element when the element either fails or becomes so loaded with contaminants that the system is starved for filtered fluid downstream of the filter. Removability is ensured by placing the filter element in a filter chamber or bowl, to which access is provided either by removing the bowl or by removing the top of the bowl or chamber. When the filter is removed, the unfiltered fluid in the chamber before the filter becomes mixed with the filtered fluid in the chamber downstream of the filter, and before it is possible to place a fresh filter element in the assembly, it is necessary to clean out the filter chamber or bowl of unfiltered fluid, in order to prevent contamination of the downstream filtered fluid surface or side of the filter. This is a considerable nuisance, since it wastes fluid, and is time-consuming.

It is also a particular problem when the filter chamber or bowl is in an inaccessible location, such as, for example, when mounted in a tank or reservoir, as, for example in the case of a tank-mounted return line filter. Such a filter filters the fluid entering the tank, which filtered fluid is then held in storage in the tank, for supply of filtered fluid to the system. If any portion of the unfiltered fluid in the return line is allowed to enter the tank, the entire tank becomes contaminated, and must be filtered again before it can be used. In such a situation, it is essential that the replacement of the filter element be possible without contamination of the downstream filtered fluid with upstream unfiltered fluid. In tank-mounted return line filters, this normally has meant the removal of the entire filter assembly, bowl and all, and other precautions, which increases the cost and time for filter element replacement.

Most in-tank filter assemblies are arranged for filtering fluid flow from the inside-out of a cylindrical filter element. In this way the contaminants removed by the filter are inside the filter element, and when the filter element is removed from the filter bowl or chamber, the likelihood of contamination of the downstream filtered fluid with contaminants is reduced.

This however considerably complicates the relief valve system for the filter assembly. It is essential in all return line filters to provide a bypass path for relief of differential fluid pressure across the filter element, when the filter element becomes so loaded with contaminants that the differential pressure across the filter increases to the point where backpressure affects system function or filter element collapse is imminent. The provision of a relief valve for a filter element with inside-out flow usually takes the form of a reciprocably-mounted filter element which is itself the relief valve poppet, and which is spring-mounted to close off the bypass path, but which is moved outwardly from the valve seat when the differential fluid pressure increases above a predetermined minimum.

Filter elements are heavy, particularly when loaded with contaminants, and if a reciprocable filter element is subjected to vibration and/or external shock, the filter element can oscillate, and open and close the bypass path, even though the minimum differential pressure at which the bypass path should be opened has not yet been reached.

It is also difficult to build a filter for inside-out flow that withstands flow fatigue. System return lines have very high flow differences (unlike system pressure lines), and the resistance of a filter element to differential fluid pressure is greatly diminished after it has experienced a number of high flow surges. If the filter element is corrugated, the corrugations are expanded outwardly into the supporting sheath, stretching and reshaping the corrugated form, and this flexing of the element eventually destroys the element.

It would be desirable, therefore, for return line filters mounted in tanks, to utilize conventional outside-in flow, with conventional relief or check valves, but this is very difficult to do, because of the contamination problem of downstream filtered fluid with unfiltered fluid when the filtered element is being changed.

What is needed is a mechanical structure which makes it possible to remove a filter element from a filter bowl or chamber without emptying the filter bowl or chamber of unfiltered fluid, which nonetheless prevents such unfiltered fluid from passing downstream of the filter into the downstream filtered fluid line, and which also makes it possible to install a clean filter element in a filter bowl or chamber containing unfiltered fluid without permitting the escape of unfiltered fluid to the downstream side of the new filter cartridge or element being installed.

In accordance with the invention, a filter assembly is provided having a filter chamber and a filter element that is replaceable without employing the filter chamber of unfiltered fluid. This is made possible by providing for attachment at the base of the filter element a weir follower that is movable along a weir in fluid-tight relation both to the base of the filter element and to the weir. The weir is spaced from and downstream of the filter element, and the weir follower moves across this space, sealing it off from the remainder of the filter chamber. When the contaminated filter element is being removed, the weir follower carries filtered fluid in the space downstream of the filter element to the top of the weir, overflowing into the tank, while the disappearance of the volumetric displacement of the removed filter element causes the level of contaminated or unfiltered fluid upstream of the filter to fall well below the top of the weir. When the clean filter element is being installed, the weir follower prevents unfiltered fluid in the filter chamber from contacting the downstream side on the interior of the filter element. The weir follower compels filtered fluid in the filter chamber to move downwardly and outwardly to the upstream side of the element. This makes it possible to protect both the filtered fluid line and the space downstream of the filter between the filter and the weir from intrusion by unfiltered fluid during both removal and installation of a filter element. After installation of the filter element the weir compels filtered fluid in the space between the filter element and the weir proceeding towards the outlet to proceed through the space by upflow, and then overflow across the weir.

Accordingly, the filter assembly of the invention comprises, in combination, a filter housing; a filter chamber in the housing; an inlet for unfiltered fluid and an outlet for filtered fluid in the housing; a filter element removably disposed in the filter chamber across the line of fluid flow from the inlet to the outlet, so that fluid flow normally proceeds through the filter; *the filter element having a top end and a base end and being removably attached in fluid tight relation at the top end to the filter housing;* a weir spaced from and downstream of the filter element defining a space therebetween and compelling filtered fluid from the filter proceeding towards the outlet to proceed through the space and then by overflow across the weir; and a weir follower operatively associated with the base of the filter element and movable along the weir in fluid-tight relation to the base and the weir, sealing off the space from the remainder of the filter chamber, to carry filtered fluid in the space to the top of the weir while a used filter element is being removed, and to displace unfiltered fluid in the filter chamber outside the space from contact with the downstream side of a clean filter element while a clean filter element is being installed.

*In a preferred embodiment, the filter assembly of the invention comprises, in combination, a filter housing; a filter chamber in the housing; an inlet for unfiltered fluid and an outlet for filtered fluid in the housing; a filter element removably disposed in the filter chamber across the line of fluid flow from the inlet to the outlet, so that fluid flow normally proceeds through the filter; a weir spaced from and downstream of the filter element defining a space therebetween and compelling filtered fluid from the filter proceeding towards the outlet to proceed through the space and then by overflow across the weir; and a weir follower operatively associated with the base of the filter element and movable along the weir in fluid-tight relation to the base and the weir, sealing off the space from the remainder of the filter chamber, to carry filtered fluid in the space to the top of the weir while a used filter element is being removed, and to displace unfiltered fluid in the filter chamber outside the space from contact with the downstream side of a clean filter element while a clean filter element is being installed.*

The weir and the weir follower operatively associated with the filter element and movable along the weir are preferably arranged concentrically of the filter element, and within the filter element, with the top of the weir at approximately two inches above the maximum level of the fluid in the tank, and at least above the level of unfiltered fluid remaining in the chamber or bowl after the displacing filter element has been removed, so that the unfiltered fluid left behind does not flow over the top of the weir, to and through the outlet for filtered fluid.

The relative volumes of the displacement of the filter element and of the filter chamber upstream of the weir are so chosen that when the filter element is removed, the level of unfiltered fluid in the filter chamber is below the top of the weir.

The weir is of conventional construction, and can take the form of an upstanding wall defining an inner wall of the filter chamber or bowl, with access to the outlet for filtered fluid being by overflow across the weir. A baffle upstream of the outlet will serve. If the filter element is tubular, a central standpipe will serve, for flow in the direction from the outside of the filter element towards the inside. An external standpipe will serve for flow in the direction from the inside to the outside of the filter element.

The weir follower movable along the weir can take any of several forms. It can, for example, be an annulus attached to or a part of or projecting inwardly from a tubular filter element end cap, slidable reciprocably with the filter element, along the weir, and sealing against the outside wall of the weir; since it is a part of the base wall of the filter element end cap, such an annulus serves as a floor seal for the annular space between the filter element and the weir, and moves up and down on the weir with the filter element.

The weir follower movable along the weir also can be slidably attached to the weir, and removably attached to the base of the filter element, so as to move with the filter element to the top of the weir when the filter element is being removed, and to the bottom of the weir when the filter element is being installed.

If desired, a detent or other catch can be placed at the top of the weir, to engage and retain the weir follower upon removal of the used filter element, and until installation of a fresh filter element. The detent or other catch can then be released, to permit the weir follower to proceed with the filter element back down the weir, to the normal position for operation.

Preferred embodiments of the filter assembly of the invention are shown in the drawings, in which.

Figure 1:
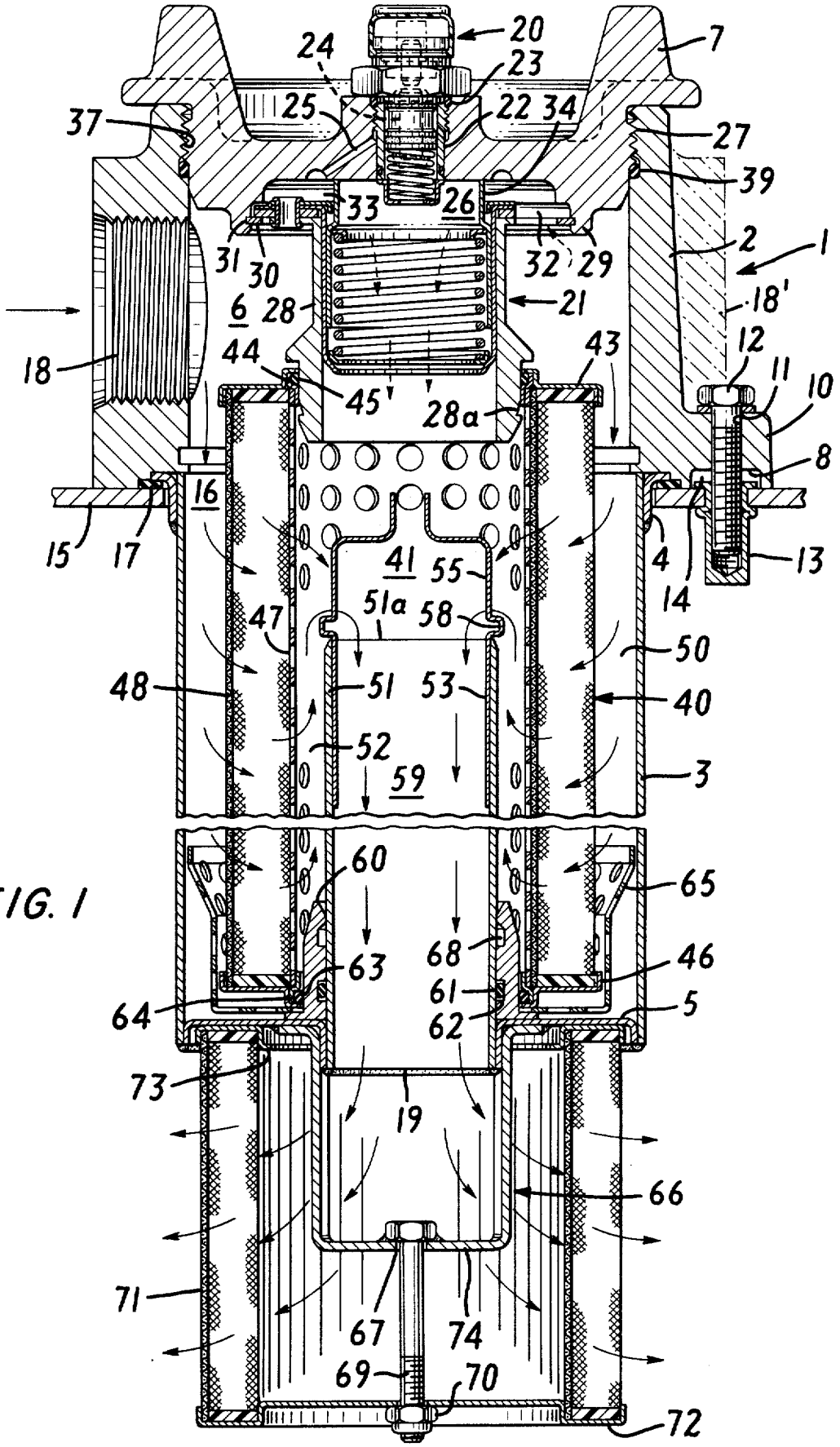
FIG. 1 is a longitudinal section taken along the line 1—1 of FIG. 3 through a filter assembly of the invention, showing the weir, weir follower and filter element attached thereto in operating position, the weir follower in this case being attached to the weir and in the form of an annulus slidable along the surface of the weir, and the weir being in the form of a standpipe.
Figure 2:
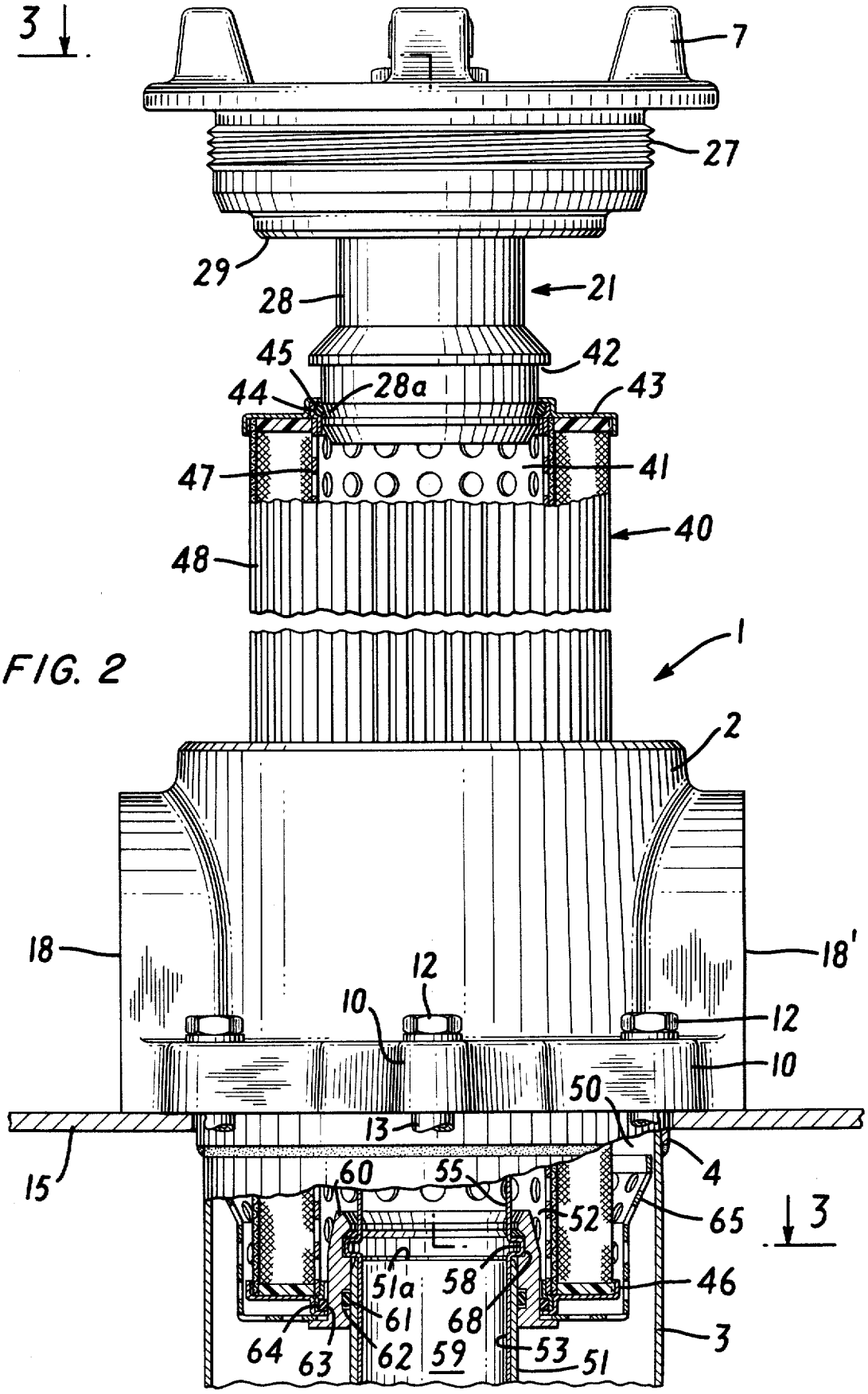
FIG. 2 is a side elevation partially in section of the filter assembly of FIG. 1, showing the weir follower in position for removal of the filter element, and before installation of a fresh filter element, retained in that position by a detent.
Figure 3:
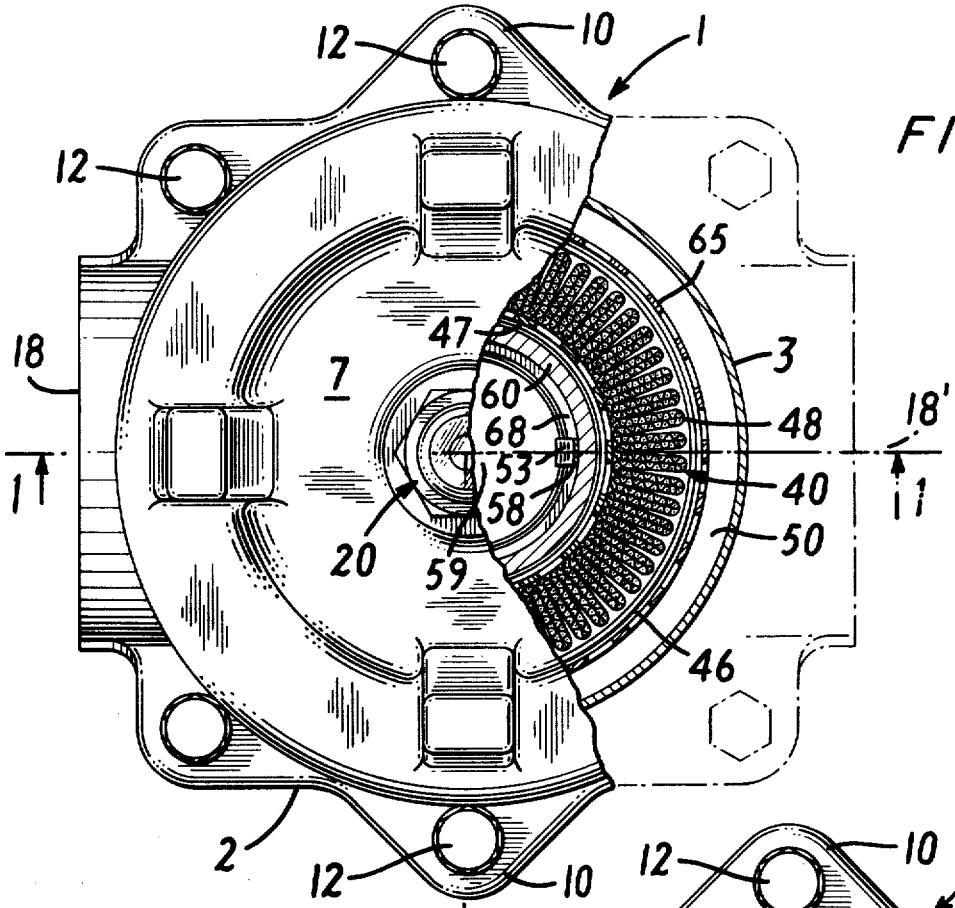
FIG. 3 is a cross-sectional view, taken along the line 3—3 of FIG. 2.

The filter assembly shown in FIGS. 1, 2 and 3 has a housing 1 in two principal parts: a filter head 2, and a filter cannister 3. The filter cannister 3 is cylindrical, and is open at one end, which is provided with an annular flange or lip 4, and closed off at the other end by an apertured cap 5. The cap and flange are attached thereto by brazing, soldering, welding, spinning or forming.

The filter head 2 has an annular configuration, with a central chamber 6 closed off at the top end by the cap 7, and at the bottom end by the filter cannister 3.

The inner face 8 of the filter head 2 has six lateral lugs or projections 10, each of which is apertured at 11 for reception of the cap screws 12, which thread into the sockets 13 of the bowl attachment plate 15. Proper alignment in securing the plate 15 to the cap screws 12 is ensured by the flanged sockets 13, which nest in the recesses 14 in the head, and a leak-tight seal between the lip 4 of the cannister 3 and the plate 15 is provided for by the gasket ring 17.

The filter assembly has provision for two inlet ports 18,18' in the filter head 2, but only inlet port 18 is cut through and open. The outlet port 19 from the assembly is the central aperture of the cap 5 across the base of filter cannister 3.

The cap 7 carries a magnetic pressure indicator 20 of conventional type, such as described in U.S. Pat. No. 2,942,572 to David B. Pall, patented June 28, 1960, and a coaxial bidirectional flow control valve 21 of the type described in U.S. Pat. No. 3,908,693 to Roydon B. Cooper, patented Sept. 30, 1975. The pressure indicator is installed in a central bore 22 of the cap 7 with sealing provided by the O-ring 23. Upstream or unfiltered fluid pressure is sensed at the inner face of the magnetic piston 24 via the passage 25, in chamber 33 upstream of the filter element and downstream fluid pressure is sensed at the outer face of the piston 24, at the open interior 26 of the coaxial flow control valve 21, which is downstream or filtered fluid pressure of the filter element, since it is in communication with filtered fluid pressure in the open interior 41 of the filter element.

The flow control valve 21 is supported on the valve cage 28 attached to portion 29 of the cap 7. The cage 28 is attached to the cap by the snap ring 30, fitting in the recess 31 of the cap. A plurality of ports 32 together with chamber 33 define a bypass passage leading from the inlet port 18 to the outlet port 19 via the relief valve element 34 of the flow control valve 21. This element engages the inner face of cap 7 and serves a relief function, in that, in response to a pressure differential across the valve between the inlet and outlet ports that exceeds a predetermined minimum, it opens and thus permits bypass flow via ports 32 and chamber 33. This predetermined minimum is however greater than the diferential pressure at which the pressure indicator 20 gives a signal, also sensed by the differential pressure indicator at chamber 33 via passage 25.

Thus, the differential pressure indicator indicates when the filter element becomes loaded sufficiently that opening of the relief valve 34 is imminent, and before it is actually opened, thus making it possible to change the filter element before unfiltered bypass flow begins. Then, in the event that the filter element be not changed and differential pressure continues to increase, valve 34 opens, and the bypass passage is opened to prevent collapse of the filter element or system instability from excess back pressure or pressure relief arising from high viscosity oil on cold start-up.

The valve cage 28 attached to the head cap 7 supporting the flow control valve 21 also seals and supports one end of the filter element 40, and actually projects into the open interior 41 of the filter element. The end cap 43 of the filter element 40 defines an internal recess 44, in which is captured an O-ring seal 45, which ensures a fluid-tight connection between the filter end cap and the cage, and thus prevents bypass of unfiltered fluid from space 6 into the space 41 in the interior of the filter element 40.

The filter element 40 carries between the end caps 43 and 46 a perforated core 47, and a corrugated microporous multilayer filter sheet 48 having a microporous layer of bonded nonwoven inorganic fibers attached to a substrate, with an average pore diameter within the range from 3 to 25$\mu$. While this filter assembly does not include it, an external sheath can also be provided, to protect the outer surface of the filter element.

The valve cage 28 also centers the filter element in the filter cannister, with a space 50 therebetween, and also spaces the core of the filter element from the weir 51, with the space 52 therebetween. In this case, the weir 51 is in the form of a standpipe, disposed in and securely attached to the base cap 5 at the periphery of the outlet 19. The space 52 collects filtered fluid that has passed through the filter, and the fluid flows through the space upwardly towards the top 51a of the weir 51.

Securely attached to the inside wall of the weir, opposite each other at 53, at the top of the weir, are two spring detents 55, in the form of resilient wire with an outward projection 58.

Movable reciprocably along the outside of the weir is an annular weir follower 60, which engages the exterior of the weir 51 in a fluid-tight seal by way of the O-ring 61 captured in the recess 62, and also engages the filter element end cap 46 in a fluid-tight seal by way of the O-ring 63, captured in the recess 64 of the end cap, thus sealing off space 52 from the rest of the space in the cannister 3. The element installation guide 65 of the weir follower 60 guides the end cap 46 of the filter element into engagement with the weir follower 60.

The weir follower 60 includes a recess 68, shaped to receive the projections 58 of the detents 55, and thus the weir follower 60 can be retained at the top of the weir. This makes it possible to remove the filter element from the weir follower 60 against the retaining action of the O-ring 63, when the follower has reached the end of its travel at the top of the weir.

Since the filter element is sealed to the housing both at its upper and lower end caps 43, 46, it will be apparent that normal fluid flow from the inlet 18 to the outlet 19 of the filter housing 1 will proceed from the inlet port 18 into the space 6, then into space 50, and then through the filter and core into the space 52 between the weir 51 and the inside of the filter core. The filtered fluid proceeds upwardly through space 52 and then by overflow over the top 51a of the weir into the open interior 59 of the weir, and then proceeds downwardly directly to the outlet 19 and then leaves the cannister 3.

Attached to the lower face of the base cap 5 of the filter cannister is a spider 66, which has a central aperture 67 in its base 74 in which is securely fastened a bolt 69. The end portion of the bolt is threaded, and receives a cap nut 70.

The cap nut and bolt secure across the outlet 19 from the filter cannister a fluid diffuser distributor 71 of stainless steel wire mesh sheet. The sheet is held between retaining plates 72, 73, and ensures that flow from the outlet is distributed relatively uniformly at a velocity of approximately 2 ft/sec. This inhibits aeration and eliminates turbulent flow in the tank downstream of the filter assembly (not shown).

In order to replace the filter element, it is necessary to remove the cap 7 from the filter head 2. The cap, which is externally threaded at 27, is retained in the threaded socket 37 of the filter head, and a fluid-tight seal at the interior portion of the socket is ensured by the O-ring seal 39. Accordingly, the cap 7 is simply unscrewed from its socket, carrying with it the cage 28. The cage 28 has a peripheral circumferential groove 28a, which is shaped to intercept the O-ring 45 on end cap 43, and thus as it is being withdrawn with cap 7 retains and carries with it the filter element 40. The filter element 40 and weir follower 60 accordingly move together to the top of the weir 51 with withdrawal of the cage 28.

Since the weir follower 60 is secured to the filter element end cap 46 and to the weir 51 in a fluid-tight seal on each side, filtered fluid above the weir follower in the space 52 is carried up with the filter element, and continues to flow by overflow into the weir 51, as the filter element 40 and weir follower 60 proceed up through the cannister, while the unfiltered fluid in the cannister flows into the space beneath, just vacated by the filter element. The volume below the top 51a of the weir and formerly occupied by the filter element 40 and space 52 is adequate to receive all of the unfiltered fluid in the chamber 50, as well as the unfiltered fluid in the space 6 above the cannister 3 in the filter head 2, and this unfiltered fluid thus cannot reach the top and flow over into the weir, into the filtered fluid line downstream of the filter.

When the weir follower reaches the top of the weir, recess 68 engages projections 58, and is retained by the detents 55, and the filter element can now be withdrawn from the weir follower, and replaced. Removal from the weir follower is simple, since the filter element is held there only by the squeezed O-ring 63.

A clean filter element is installed by placing the upper end cap 43 thereof over the cage 28, with O-ring 45 locked in groove 44, and then lowering the assembly into the cannister, bringing the lower end cap 46 into engagement with the weir follower 60, where it is sealed in place by the O-ring 63. The cap and attached assembly is then pushed down along the weir 51, until the threaded portion of the cap 7 reaches the threaded portion of the socket. The cap can then be screwed into the socket, and the closure made complete.

As this is being done, the unfiltered fluid is displaced around the bottom and up along the outside of the filter element into the space 50 between the filter element and the filter cannister. Some of this fluid may proceed through the filter into the space 52 that now is created between the filter and the weir, thus reducing the volume of fluid that needs to be accommodated on the upsteam side of the filter in space 50. Unfiltered fluid can enter the space 52 between the filter element and the weir only by passage through the filter, because of the weir follower 60, and its sealing engagement both with the weir and with the filter end cap 46. Thus, the filter element can be installed in the cannister without danger of contamination of the filtered fluid line with unfiltered fluid.

The flow distributor at the outlet end of the filter cannister can be removed and replaced when required, simply by removal of the cap nut 70.

Figure 6:
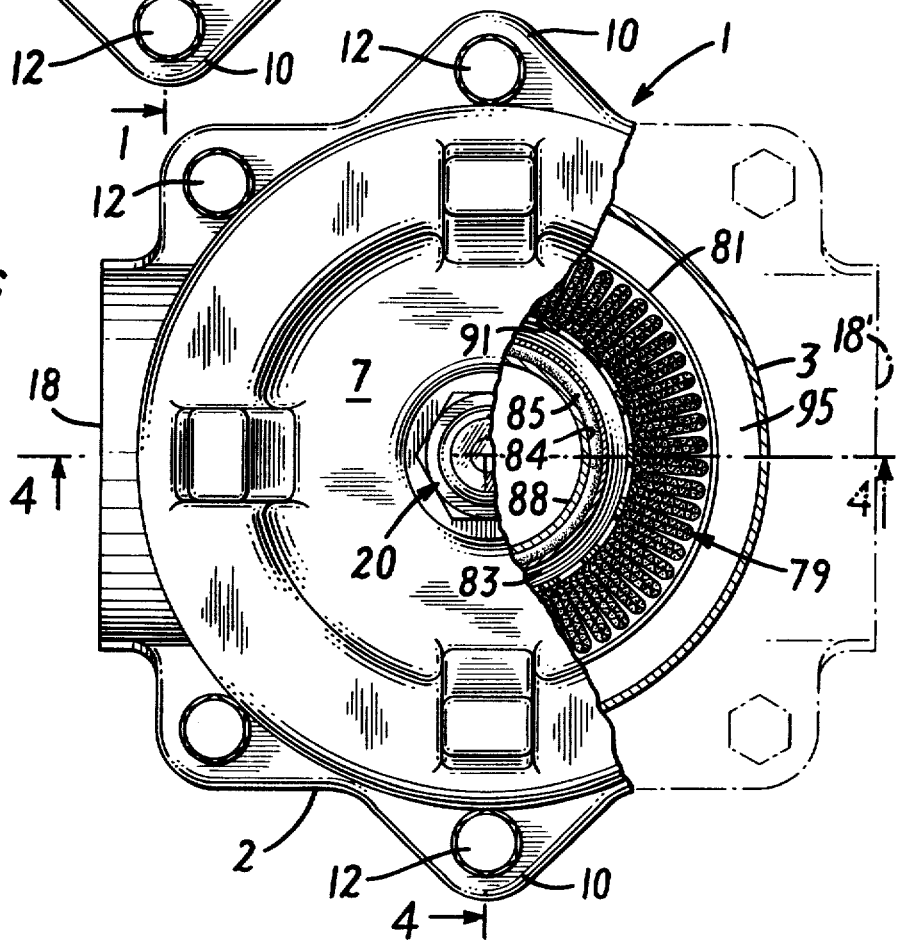
FIG. 6 is a cross-sectional view taken along the line 6—6 of FIG. 4.
Figure 4:
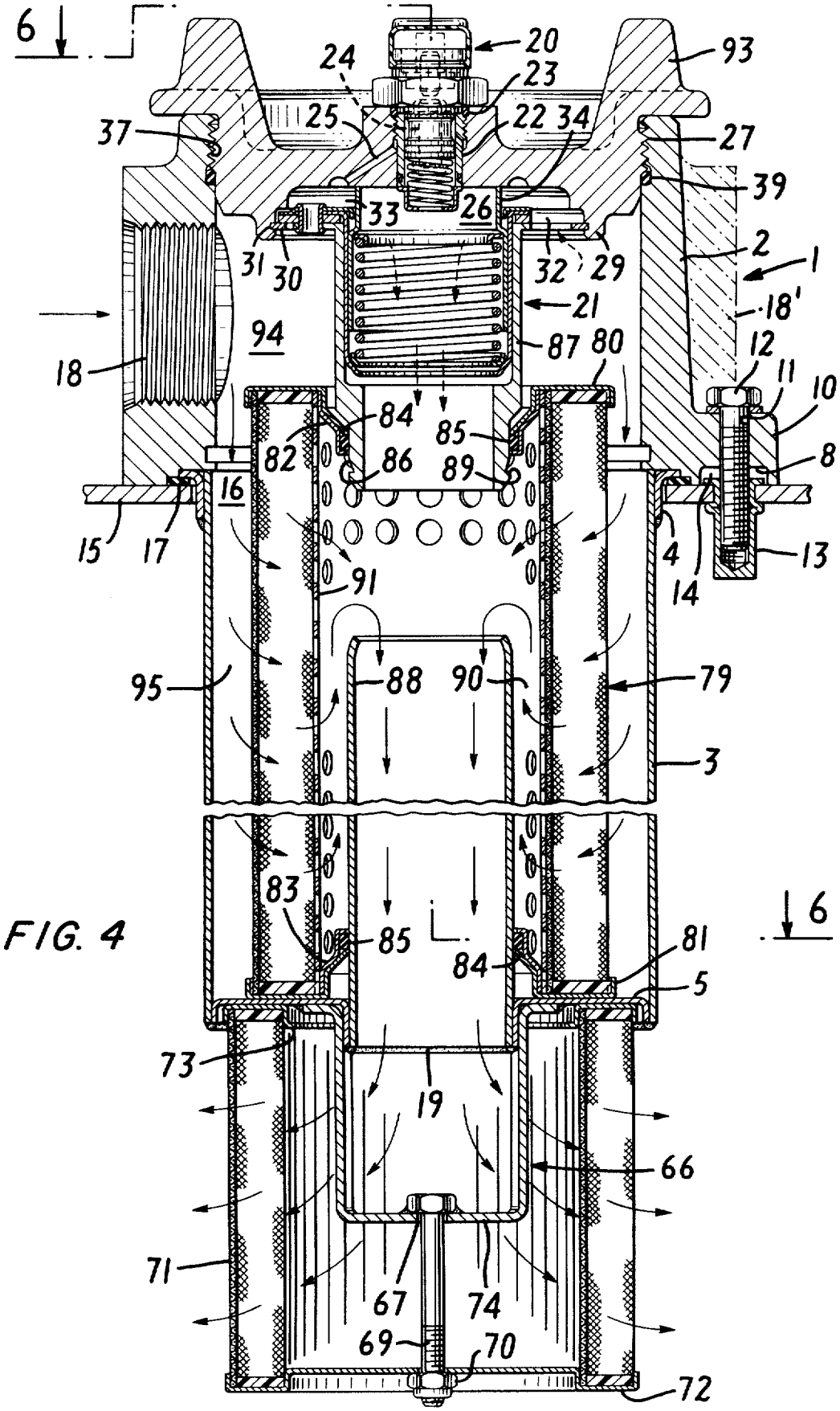
FIG. 4 is a longitudinal section taken along the line 4—4 of FIG. 6 through another embodiment of filter assembly in accordance with the invention, in which the weir is a standpipe, and the weir follower is an annulus attached to each filter element end cap, with the filter element installed in operating position in the assembly.
Figure 5:
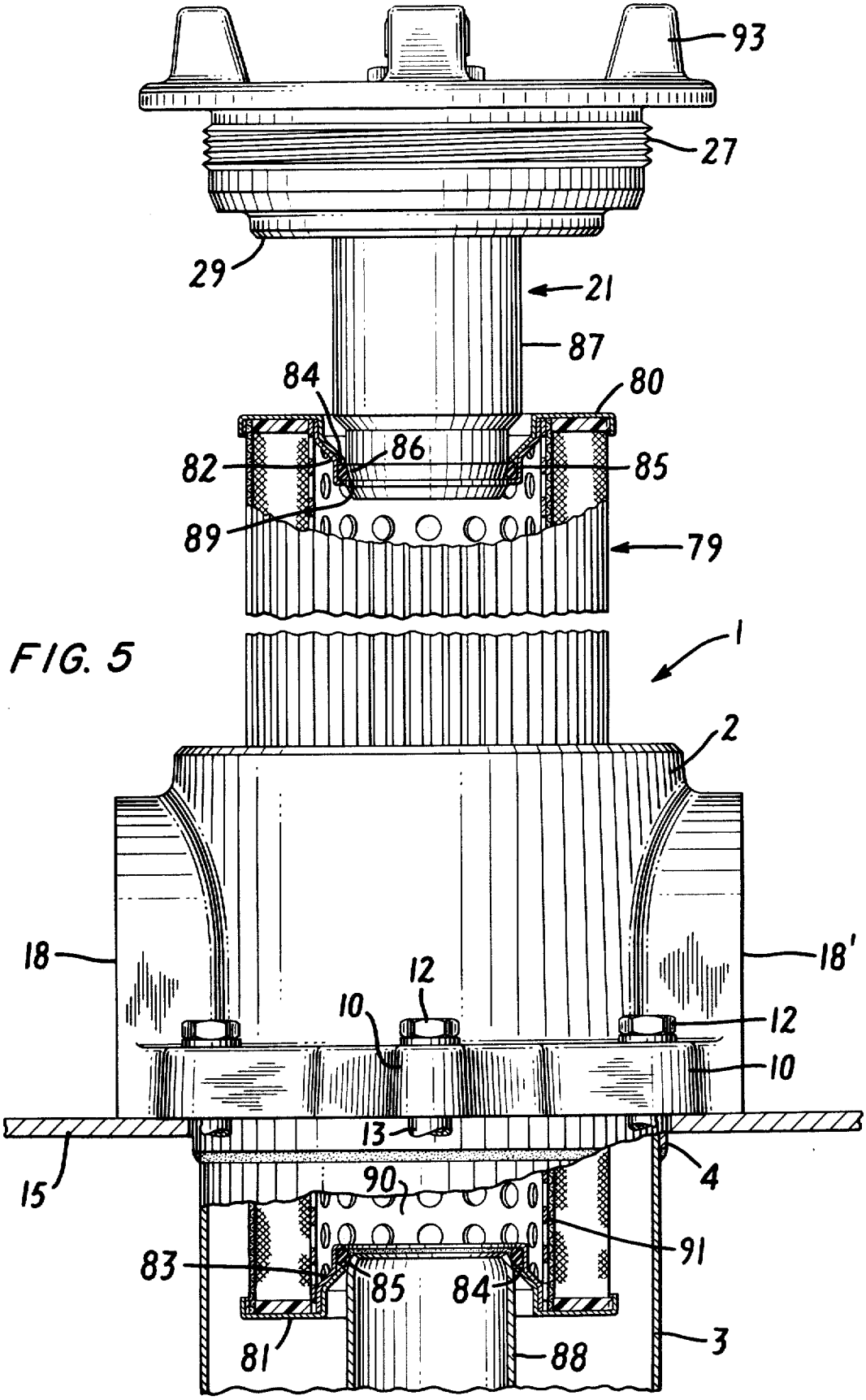
FIG. 5 is a side elevation partially in section of the filter assembly of FIG. 4, showing the filter element in position at the top of the weir, as in replacement of the filter element, and installation of a fresh filter element.
Figure 7:
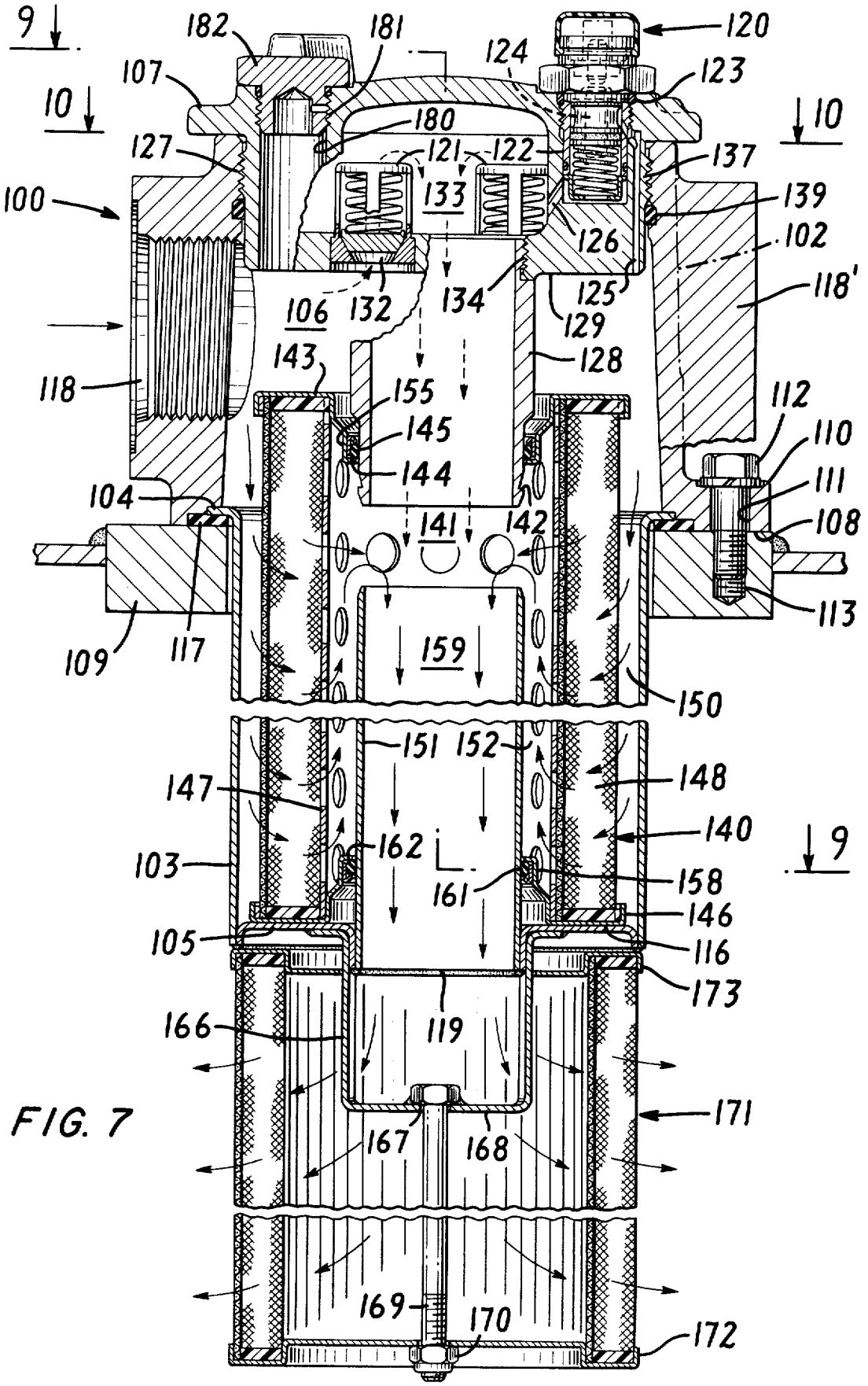
FIG. 7 is a longitudinal section taken along the line 7—7 of FIG. 9 through another embodiment of filter assembly in accordance with the invention in which the weir is a standpipe, and the weir follower is an annulus slidably attached to the weir, and removably attached to one filter element end cap, with the filter element installed in operating position in the assembly.
Figure 8:
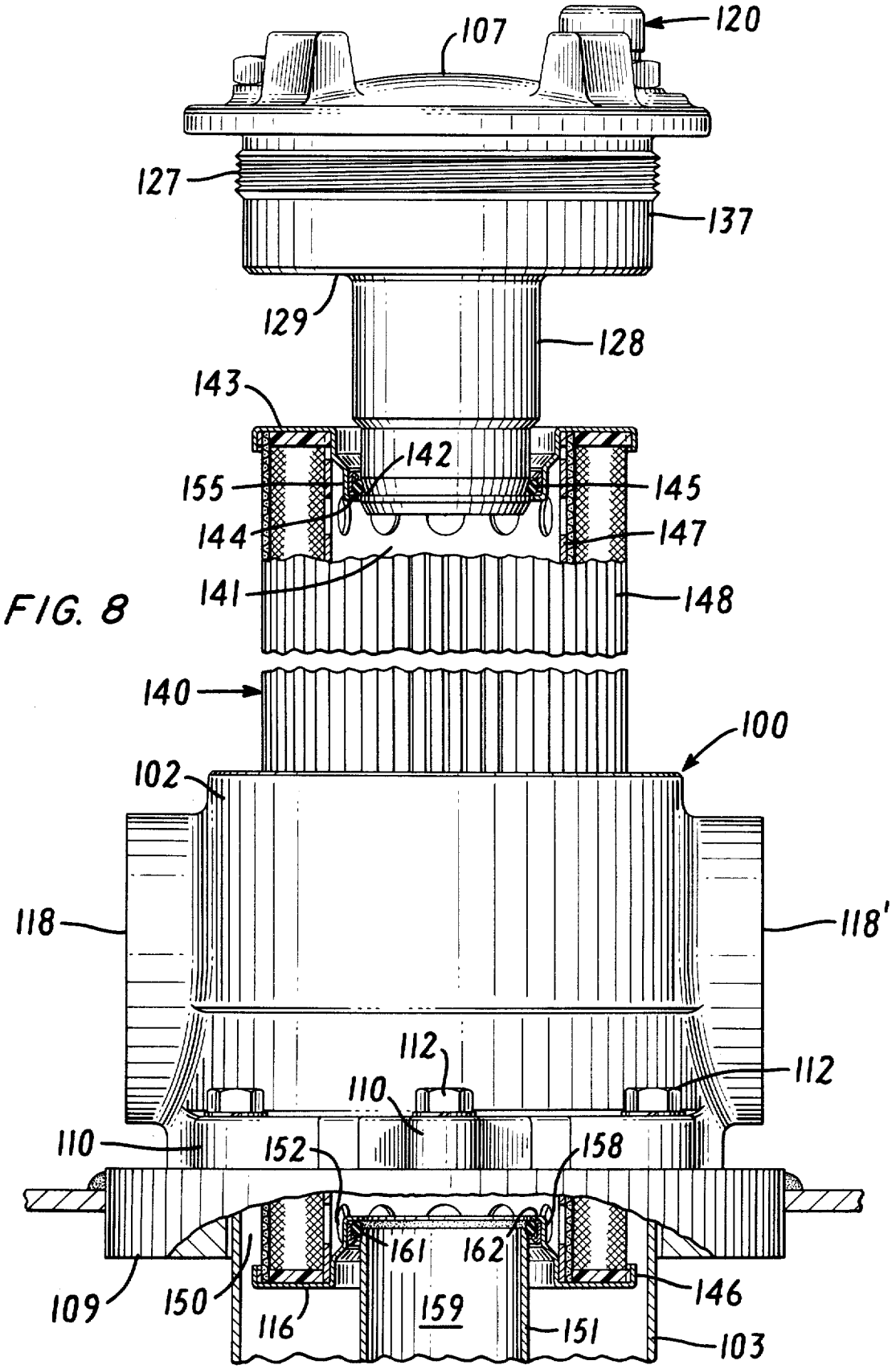
FIG. 8 is a side elevation partially in section of the filter assembly of FIG. 7, showing the filter element in position at the top of the weir, as in replacement of the filter element, and installation of a fresh filter element.
Figure 9:
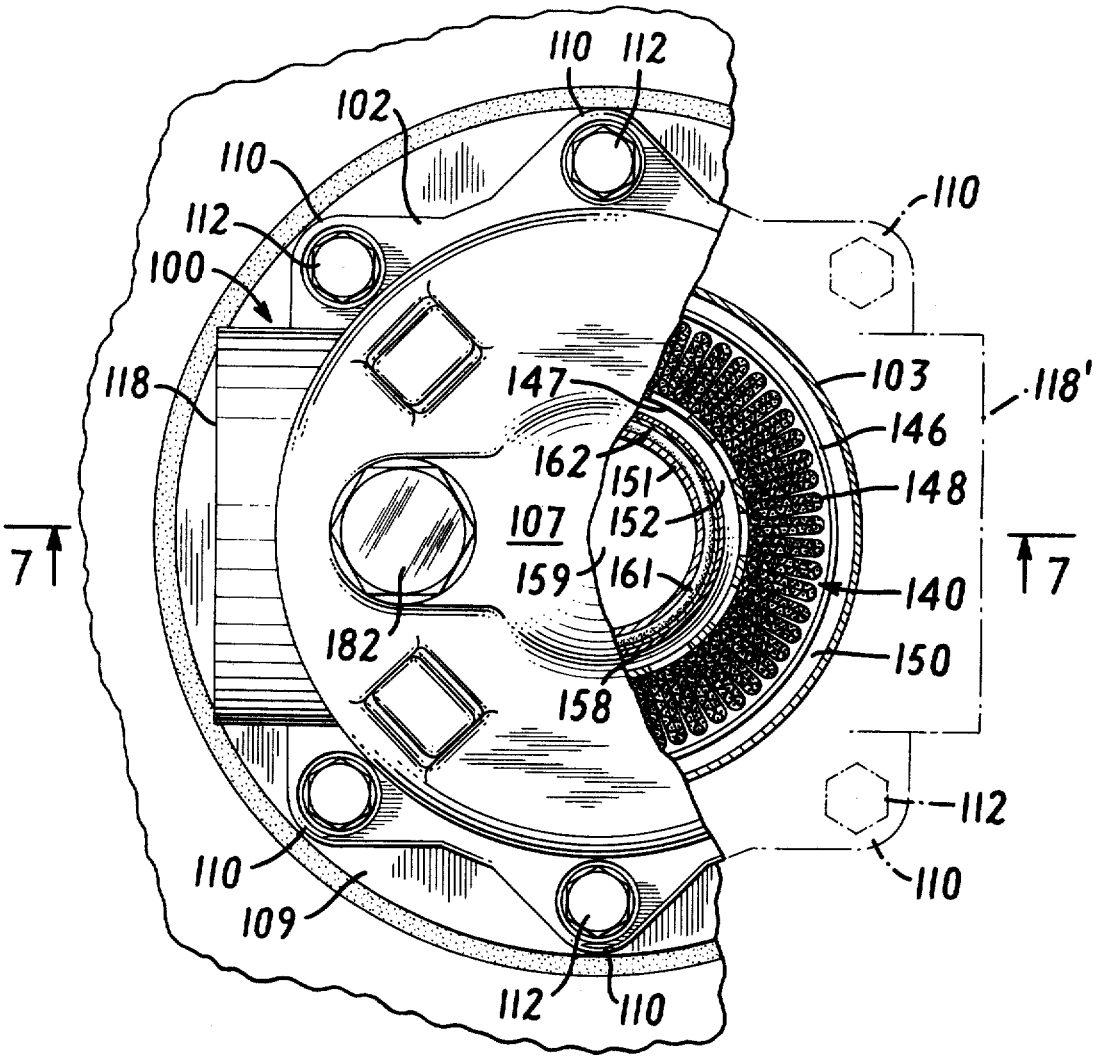
FIG. 9 is a cross-sectional view taken along the line 9—9 of FIG. 7.
Figure 10:
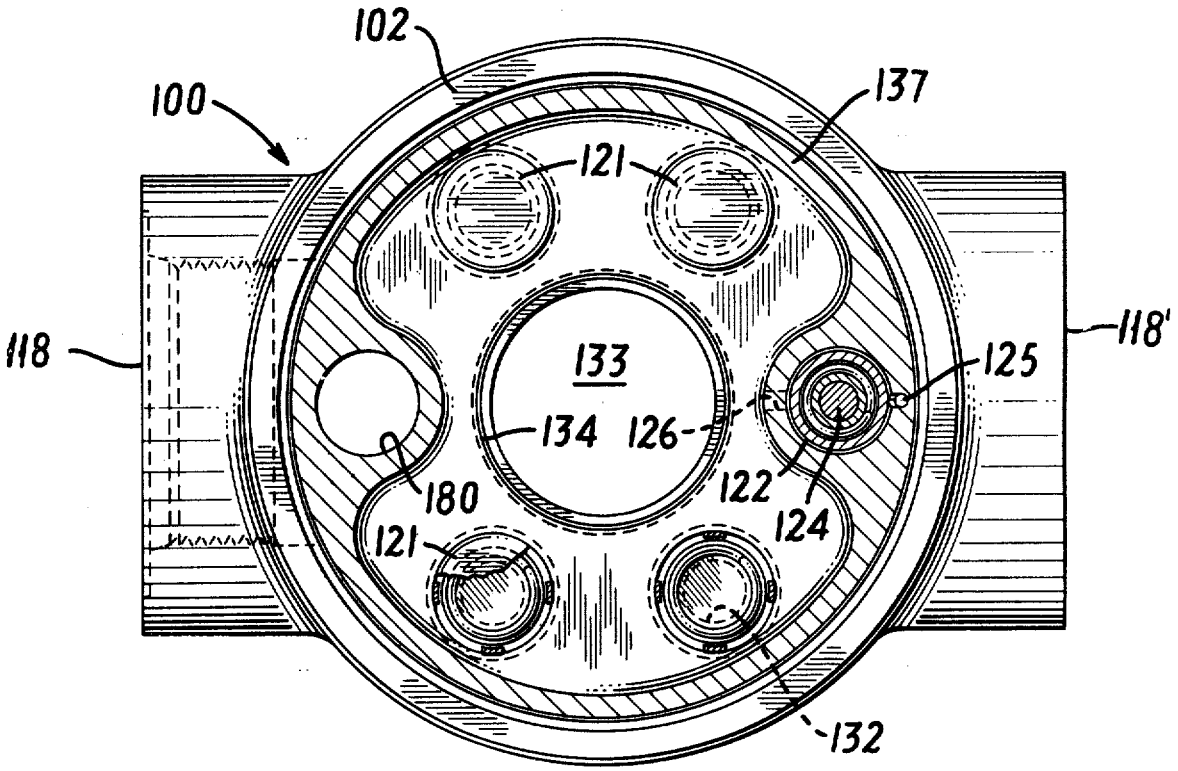
FIG. 10 is a cross-sectional view at the top of the filter assembly taken along line 10—10 of FIG. 7.

The filter assembly shown in FIGS. 4, 5 and 6 is generally similar to that of FIGS. 1, 2 and 3, except that the weir follower is attached to the filter element end caps instead of to the weir, and is removable therewith from the weir. Consequently, the description of the embodiment of FIGS. 4, 5 and 6 will be confined to the discussion of the weir follower.

Since a weir follower is attached to each end cap, there is a slightly differing engagement of the top end cap of the filter to the cage 87 attached to the cap 93. It will be understood that the remainder of the description of the filter assembly of FIGS. 1, 2 and 3 is applicable to the filter assembly of FIGS. 4, 5 and 6, and like reference numerals are therefore applied to like parts.

In this case, the end caps 80, 81 of the filter element 79 are each provided with identical weir followers 82, 83, projecting inwardly from the end cap, each with a recess 84 that captures an O-ring 85, shaped to sealingly engage the portion 86 of the cage 87, and the groove 89, as well as the weir 88. The portion 86, for standardization of parts, is identical in external diameter with the external diameter of the weir 88. Thus, the filter element 79 can in fact be installed either side up in the assembly and the weir followers 82, 83 will seal against both cage and weir, either way.

The lower weir follower 83 of end cap 81 via its O-ring seal 85 engages the outside wall of the weir 88 in a fluid-tight seal. Since the weir follower 83 is securely attached to the end cap in a fluid-tight seal, the space 90 between the core 91 of the filter element and the weir 88 is effectively sealed off against entry of unfiltered fluid except through the filter, and the upper weir follower 82 of end cap 80 via its O-ring seal 85 likewise ensures that entry of unfiltered fluid over the top of the filter element from the space 90 between the filter element and the cage 87 is also prevented.

In order to remove the filter element, one simply unscrews the cap 93 of the filter head, and withdraws it from the cannister together with cage 87. The cage groove 89 engages the weir follower 82 via O-ring 85, so that the filter element is retained to the cage 87, and is removed with the cap from the head. As this is being done, the filter element is slid up along the weir 88. As the filter element is being withdrawn, the unfiltered fluid in the space 95 on the outside of the filter element can enter the volume formerly occupied by the filter element 79 and the space 90 between it and the weir 88, and this volume is sufficient to accommodate below the top of the weir 88 all of the unfiltered fluid in the space 95 between the filter element and the cannister, and the space 94 above this, in the filter head. Accordingly, the filter element 79 can be withdrawn without contamination of the filtered fluid line with unfiltered fluid flowing over the top of the weir 88.

When it is desired to install a fresh filter element, one simply inserts one end cap weir follower over the cage 87, so that the cage engages the weir follower, and the other end cap weir follower over the top of the weir 88, and then pushes the head cap 93, cage 87 and the filter element 79 down along the weir into the cannister. As one does so, the unfiltered fluid beneath the filter is displaced into the space 95 between the filter and the cannister. As it is thus being displaced, some of it can filter through the filter into the space 90, now re-created between the filter and the weir, thus becoming filtered fluid, but by the time the filter has been pushed down to the bottom of the cannister, all of the unfiltered fluid has been displaced outwardly and upwardly. Thus, the filter element can be installed without contamination of the downstream side of the element with unfiltered fluid.

The filter head cap can then be threaded into place. After the cap has been installed in a leak-tight manner, the filter assembly is ready for operation, and bypass of unfiltered fluid is effectively prevented until the filter element is loaded with contaminants, to the point that the flow control valve bypass opens, as indicated previously.

The filter assembly shown in FIGS. 7, 8, 9 and 10 is especially designed for use as an in-tank return line filter, and as such is generally similar to that of FIGS. 1 to 6, with provision of a fill port on the upstream side of the filter so that addition of fluid to the tank is via the filter. This filter assembly has a housing 100 in two principal parts: a filter head 102 and a filter cannister 103. The filter cannister 103 is cylindrical, and is open at one end, which is provided with an annular flange or lip 104, and closed off at the other end by an apertured cap 105. The cap and flange are attached thereto by brazing, soldering, welding, spinning or forming.

The filter head 102 has an annular configuration, with a central chamber 106 closed off at the top end by the cap 107, and at the bottom end by the filter cannister 103.

The housing is provided with an annular ring 109 which can be welded in place at the outer periphery to the tank, thus facilitating permanent installation of the assembly in any kind of tank.

The inner face 108 of the filter head 102 has six lateral lugs or projections [100] *110*, each of which is apertured at 111 for reception of the cap screws 112, which pass through the bores 111 of the lugs 110 and are secured in threaded sockets 113 in the ring 109. A leak-tight seal between the lip 104 of the cannister 103 and the ring 109 is provided for by the gasket ring 117.

The filter head 102 has an inlet port 118. The outlet port 119 is the aperture in cap 105 at the other end of the filter cannister 103.

The cap 107 carries at one side, off center, a magnetic pressure indicator 120 of conventional type, such as described in U.S. Pat. No. 2,942,572 to David B. Pall, patented June 28, 1960, and from two to eight relief valves 121 of the conventional poppet type. The pressure indicator is installed in a side bore 122 of the cap 107, with sealing provided by the O-ring seal 123. Upstream unfiltered fluid pressure is sensed at the inner face of the magnetic piston 124 via the passage 125, leading to chamber 106, upstream of the filter element, and downstream fluid pressure is sensed at the outer face of the piston 124, via the passage 126 to the filtered fluid space 141 on the interior, i.e., downstream, of the filter element.

The relief valves 121 are press-fitted into sockets in the head 137, and are in flow connection on their upstream side via passages 132 with space 106, and on their downstream side with chamber 133 of the cap 107. A filter element adapter 128 is threaded into the socket 134 of the head 137 in fluid flow connection at its open interior with the chamber 133 leading to the outlet port 119 via the open interiors of the adapter 128 and weir 151. In response to a pressure differential across the valves 121 between the inlet port 118 and outlet port 119 that exceeds a predetermined minimum, the valves 121 open, and thus permit bypass flow via passages 132, 133 into and through the adapter 128 and weir 151 to the outlet 119. This predetermined minimum is how ever greater than the differential pressure sensed by the differential pressure indicator at passages 125, 126 at which the pressure indicator 120 gives a signal.

Thus, the differential pressure indicator indicates when the filter element becomes loaded sufficiently that opening of the relief valves 121 is imminent, and before they are actually opened, making it possible to change the filter element before unfiltered bypass flow begins. In the event that the filter element be not changed, and differential pressure continues to increase, one to eight of the relief valves 121 open, and the bypass passages 132, 133 are opened to prevent collapse of the filter element or system instability from excess back pressure or pressure relief arising from high viscosity oil on cold start-up.

The head cap 107 also has a through bore 180 opening at one end to the exterior of the cap at threaded port 181 which is closed off by fill cap 182, and opening at the other end to the chamber 106. This bore serves as a fill passage, to add liquid to the tank in which the assembly is installed, and all such liquid since it is admitted upstream of the filter is filtered as it passes into the tank.

The element adapter 128 attached to the head cap 107 at socket 134 thereof supports one end of the filter element 140, and actually projects into the open interior 141 of the filter element. There is an external recess 142 of this portion of the element adapter 128. The end cap 143 of the filter element 140 carries a weir follower 155 projecting inwardly, which defines a recess 144, in which is captured an O-ring 145, which ensures a fluid-tight connection between the filter end cap and the element adapter, and thus prevents bypass of unfiltered fluid into the space 141 in the interior of the filter element 140.

The filter element 140 carries between end caps 143 and 146 a perforated core 147, and a corrugated microporous multilayer filter sheet 148 having a microporous layer of bonded nonwoven inorganic fibers attached to a substrate, with an average pore diameter within the range from 3 to 25$\mu$. While this filter assembly does not include it, an external sheath can be provided, to protect the outer surface of the filter element.

The element adapter 128 centers the filter element in the filter cannister, with a space 150 therebetween, and spaces the core of the filter element from the weir 151, with the space 152 therebetween. In this case, the weir 151 is in the form of a standpipe, disposed in and securely attached to the outlet 119 in the base cap 105 of the filter cannister.

Securely attached to the inside wall of the weir, opposite each other at 153, at the top of the weir, are two spring detents 155, in the form of resilient wire with an outward projection 158.

The end cap 146 carries a weir follower 158 which is movable reciprocably along the outside of the weir and engages the exterior of the weir 151 in a fluid-tight seal by way of the O-ring 161 captured in the recess 162.

The adapter 128 includes a groove 142, shaped to intercept O-ring 145 of the weir follower 155, and thus when the cap 107 is being removed from the cannister 103 the filter element is retained to the cap, and carried with it. This makes it possible to remove the filter element at the same time as the cap 107 is being withdrawn.

Since the filter element is sealed to the adapter 128 at its upper end cap 143 and to the weir at its lower end cap 146, it will be apparent that normal fluid flow from the inlet 118 to the outlet 119 of the filter housing 100 will proceed from the inlet port 118 into the space 106, then into space 150, and then through the filter 140 into the space 152 between the weir and the inside of the filter core. The filtered fluid proceeds by overflow over the top of the weir 151 into the open interior 159 of the weir, and then proceeds directly to the outlet 119 from the cannister 103.

Attached to the lower face of the base cap 105 of the filter cannister is a spider 166, which has a central aperture 167 in its base 168 in which is securely fastened a bolt 169. The end portion of the bolt is threaded, and receives a cap nut 170.

The cap nut and bolt secure across the outlet 119 from the filter cannister a fluid diffuser distributor 171 of stainless steel wire mesh sheet. The sheet is held between retaining plates 172, 173, and ensures that flow from the outlet is distributed relatively uniformly at a velocity of approximately 2 ft/sec. This inhibits aeration and eliminates turbulent flow in the tank downstream of the filter assembly (not shown).

In order to replace the filter element, all that is necessary is to remove the cap 107 of the filter head 102. The cap, which is externally threaded at 127, is retained in the threaded socket 137 of the filter head, and a fluid-tight seal at the interior portion of the socket is ensured by the O-ring seal 139. Accordingly, the cap 107 is simply unscrewed from its socket, carrying with it the adapter 128, and with the adapter the filter element 140, the end cap 143 being held by O-ring 145 in groove 142. The filter element 140 and weir follower 158 move together to the top of the weir 151. Since the follower 158 seals against the weir 151 in a fluid-tight seal, filtered fluid above the weir follower in space 152 is carried up with the filter element 140, and continues to flow by overflow into the weir 151, as the filter element 140 and weir follower 158 proceed up through the cannister, while the unfiltered fluid in the cannister flows into the space beneath, formerly occupied by the filter element 140 and space 152. The volume thus released for unfiltered fluid is adequate, by the time the filter element 140 has reached the top of the weir 151, to receive all of the unfiltered fluid in the space 150, as well as in the space 106 above the filter element in the filter head 102, and this unfiltered fluid is below the top of the weir and thus does not flow into the filtered fluid line downstream of the filter.

When the weir follower 158 reaches the top of the weir 151, the filter element can be withdrawn and replaced.

A fresh filter element is installed by placing the projecting portion of the adapter 128 into the weir follower 155 of end cap 143, and then placing weir follower 158 of the lower end cap 146 over the weir 151. The assembly is then pushed down along the weir until the threaded portion of the cap 107 reaches the threaded portion of the socket. The cap can then be screwed into the socket, and the closure completed.

As this is being done, the unfiltered fluid is displaced outwardly and upwardly around the bottom and outside of the filter element 140 into the space 150 between the filter element and the filter cannister. Some of this fluid may proceed through the filter into the space 152, now re-created between the filter and the weir, thus reducing the volume of fluid to be accommodated on the upstream side of the filter, in space 150. Unfiltered fluid cannot enter the space 152 between the filter elements and the weir except by passage through the filter, because of the weir follower 158, and its sealing engagement with the weir. Thus, the filter element can be installed in the cannister without danger of contamination of the filtered fluid line with unfiltered fluid. The level of unfiltered fluid in the cannister will be below the top of the filter and the weir, when installation is complete.

After the filter and the cap have been fully installed, and the cap 107 sealed to the head, flow can again begin.

The flow distributor at the outlet end of the filter bowl can be removed and replaced when required, simply by removal of the cap nut.

The drawings all show embodiments having internal weirs for filtered flow from outside-in of the filter element.

If flow through the filter is from inside-out, then the weir can be concentrically disposed outside the filter element, and the weir follower will be outside the filter element as well, between the filter element and the weir. Then, unfiltered liquid is confined inside the weir, rather than outside. The filtered fluid is of course collected and distributed from outside the weir, but otherwise the assembly is exactly the same.

The drawings all show embodiments having cylindrical filter elements. The invention is also applicable to flat or curved sheet filter elements, such as a corrugated filter sheet. In this case, the filter chamber is in two parts, with the weir a compartmenting divider wall separating the two parts. The filter is disposed on one side of the weir, with the weir follower and space therebetween. Again the weir flow proceeds through the filter to the space between the filter and weir, over the top of the weir. Filtered fluid is collected on the other side of the weir and the weir and weir follower protect the downstream side of the filter from contamination with unfiltered fluid, when the filter is removed.

The filter assemblies of the invention are useful with any filter element having a filter sheet in tubular or cylindrical form, provided with end caps to close off the interior space enclosed by the filter sheet, and give control of the flow of filtrate. One or both of the end caps can be provided with flow passages for filtrate flow. The caps can be of any desired material, appropriate to the system and the need, and are bonded to the cylinder ends in a leak-proof seal by appropriate bonding agents. Such filter elements are conventional, and well known to those skilled in this art, and form no part of the instant invention. Melt-sealed end caps, as disclosed in U.S. Pat. No. 3,457,339, patented July 22, 1969, to David B. Pall, et al, may be used.

The filter sheets can be formed of any porous sheet material having pores extending from surface to surface. One or several sheets of the same or varying porosity, and one or more of which may act as prefilters, can be employed, in close juxtaposition, or even bonded together, or also spaced apart. Sheets such as open-weave wire or plastic mesh may be added. Paper, which can, if desired, be resin-impregnated, is a preferred base material, since it yields an effective, versatile and inexpensive fluid-permeable filter medium. The invention is, however, applicable to sheet materials formed of any type of fiber, including not only cellulose fibers but also synthetic resin fibers and fibers of other cellulose derivatives including, for example, fibers of polyvinyl chloride, polyethylene, polypropylene, polyvinylidene chloride, cellulose acetate, cellulose acetate propionate, viscose rayon, polyacrylonitrile, polymers of terephthalic acid and ethylene glycol, polyamides, and protein fibers of various sorts, such as zein and the alginates, glass, asbestos, potassium titanate, mineral wool, polystyrene, rubber, casein, hemp, jute, linen, cotton, silk, wool, and mohair. Also useful, in addition to papers, are textile and wire fabrics, and woven and nonwoven fibrous layers of all kinds, such as felts, mats and bats made of fibrous materials of any of the types listed above, and woven wire mesh.

The sheet material should in most cases be sufficiently rigid to be self-supporting when folded in cylindrical form, but if it is not, a core and/or external sheath of rigid metal, plastic or similar rigid material can be provided, as a support.

Also, the filter sheet material of which the filter elements of the invention are made can be, if desired, impregnated with a synthetic resin or cellulose derivative to increase its strength and resistance to wear by the fluid being filtered. The impregnating agent can be any material useful in the impregnation of papers and textile materials. Such materials are well known in the paper and textile arts, and form no part of the instant invention. The impregnating agents can be in liquid form, capable of undergoing solidification as by polymerization, cross-linking, or the like. They can also be in solid form, and applied to the base from a solution in an inert solvent, or as melts. Representative impregnating resins include phenol-formaldehyde resins, urea-formaldehyde resins, melamine-formaldehyde resins, polyester resins, and polyepoxide resins.

The end caps capping the filter tube or cylinder can be of any desired material, such as metal or plastic. The end cap should be rigid, and attached to the tube or cylinder in a leak-tight seal. The end cap can be formed by molding or casting in the desired shape, integral or in one piece with the means movable along the weir, if this be part of the end cap, as in FIGS. 4 to 6.

The core and/or sheath support sections and end caps can be formed of any desired material sufficiently rigid to provide adequate support for the filter sheet with which it is to be used. Metal core supports are preferred, such as core supports of stainless steel or aluminum, which are readily stamped in any desired cross-sectional configuration, and which will retain that configuration and provide the desired rigidity. Stainless steel, which provides greater resistance to certain highly reactive fluids, is preferred. Steel, copper, magnesium, beryllium, titanium, nickel, iron and various alloys thereof are typical additional metals which can be used.

The core and/or sheath supports and end caps also can be formed of rigid synthetic polymeric materials and cellulose derivatives, such as, for example, glass, ceramics, phenol-formaldehyde resins, polytetrafluoroethylene, polychlorotrifluoroethylene, urea-formaldehyde resins, melamine-formaldehyde resins, polyvinyl chloride, polyvinylidene chloride, polystyrene, epoxy resins, polyoxymethylene, polypropylene, polyethylene, polyvinyl butyral, cellulose acetate, ethyl cellulose and cellulose acetate propionate. Cores made of such materials can be formed into core sections by molding from powders of the material, or by stamping or shaping of sheets of the material. This may be easier than molding the entire core support, in the case of complex cross-sectional configurations and when complex end connections for the core support are necessary. The plurality of sections composing such core supports of the invention can be bonded together by application of heat and pressure, or a suitable adhesive, or by application of a solvent for the material which will make possible fusion of the adjacent edges of the sections at the seams.

A suitable core is described in U.S. Pat. No. 3,246,766, to David B. Pall.

Having regard to the foregoing disclosure, the following is claimed as the inventive and patentable embodiments thereof:

1. A filter assembly having a filter chamber and a filter element therein that is replaceable without contamination of filtered fluid with unfiltered fluid in the filter chamber even though the filter chamber is not emptied of unfiltered fluid when a filter element is removed and installed, comprising, in combination, a filter housing; a filter chamber in the housing; an inlet for unfiltered fluid and an outlet for filtered fluid in the housing; a filter element removably disposed in the filter chamber across the line of fluid flow from the inlet to the outlet so that fluid flow from the inlet to the outlet normally proceeds through the filter; a weir spaced from and downstream of the filter element, compelling filtered fluid from the filter flowing towards the outlet to proceed upwardly through the space between the weir and the filter and then by overflow across the weir; and a weir follower operatively associated with the base of the filter element [and] *removably attached to one end of the filter element and mounted on the weir in a manner to be retained thereon while a used filter element is being removed, and while a clean filter element is being installed, and slidably* movable along the weir in fluid-tight relation to the base and the weir, to carry filtered fluid in the space between the weir and the filter element on the downstream side of the filter element to the top of the weir while a used filter element is being removed, and to displace unfiltered fluid in the filter chamber from contact with the downstream side of a clean filter element while the clean filter element is being installed.

[2. A filter assembly according to claim 1, in which the weir follower is removably attached to one end of the filter element and is slidably mounted on the weir in a manner to be retained thereon while a used filter element is being removed, and while a clean filter element is being installed.]

3. A filter assembly according to claim [2,] *1* in which the filter element is cylindrical with end caps, and the weir follower is removably attached to one end cap.

[4. A filter assembly according to claim 1, in which the weir follower is removably attached to the weir and fixed to the filter element in a manner to be retained thereon while a used filter element is being removed, and while a clean filter element is being installed.]

[5. A filter assembly according to claim 4, in which the filter element is cylindrical with end caps, and a weir follower is fixed to each end cap.]

6. A filter assembly according to claim 1, in which the filter element is tubular with an open center and end caps having central apertures, and the weir and the weir follower are disposed concentrically within the open center of the filter element tube.

7. A filter assembly according to claim 6, in which the top of the weir extends high enough and the filter chamber volume below the top of the weir is large enough that the top of the weir is above the level of unfiltered fluid remaining in the filter chamber after the filter element has been removed, so that the unfiltered fluid left behind in the chamber does not flow over the top of the weir into the outlet for filtered fluid.

8. A filter assembly according to claim 6, in which the filter housing has a projection extending into the filter chamber above the weir, extending into and sealing off one end of the filter element at the end cap, with the weir follower sealing off the other end of the filter element at the other end cap.

9. A filter assembly according to claim 1, in which the weir is an upstanding wall defining an inner wall of the filter chamber on the downstream side of the filter element with access to the outlet for filtered fluid being by overflow across the top of the weir.

10. A filter assembly according to claim 9, in which the filter element is tubular with an open center and end caps having central apertures, and the weir is a baffle disposed concentrically within the filter element upstream of the filtered fluid outlet of the housing for filtered flow in the direction from the outside of the filter element towards the inside.

11. A filter assembly according to claim 1, in which the filter element is tubular and the weir is a central standpipe for flow in the direction from the outside of the filter element towards the inside.

[12. A filter assembly according to claim 1, in which the filter element is tubular with an open center and end caps having central apertures and the weir follower is an annulus projecting inwardly from an end cap, slidable along the outside of the weir, having a recess facing the weir outside, capturing a sealing element in the recess, and sealing against the outside of the weir at the sealing element.]

13. A filter assembly according to claim 1, in which the filter element is tubular with an open center and end caps having central apertures and the weir follower is an annulus projecting outwardly from the weir, slidable along the outside of the weir, having a recess facing the filter element end cap, capturing a sealing element in the recess, and removably sealing against the filter element end cap, and sliding with the filter element to the top of the weir when the filter element is being removed, and to the [button] *bottom* of the weir when the filter element is being installed.

14. A filter assembly according to claim 1, having a detent at the top of the weir, to engage and retain the weir follower upon removal of the used filter element, the detent being releasable after installation of a fresh filter element, to permit the weir follower to proceed with the filter element down the weir to the operating position.

15. A tank for storage of filtered fluid having a feed outlet line and a return inlet line for circulation of fluid to and from the tank, and, disposed in the return line upstream of the tank, a filter assembly according to claim 1.

16. A tank according to claim 15, in which the filter assembly has a port for entry of fluid for replenishing fluid in the tank, and filtering such fluid before entry into the tank.

*17. A filter assembly having a filter chamber and a filter element therein that is replaceable without contamination of filtered fluid with unfiltered fluid in the filter chamber even though the filter chamber is not emptied of unfiltered fluid when a filter element is removed and installed, comprising, in combination, a filter housing; a filter chamber in the housing; an inlet for unfiltered fluid and an outlet for filtered fluid in the housing; a filter element removably disposed in the filter chamber across the line of fluid flow from the inlet to the outlet so that fluid flow from the inlet to the outlet normally proceeds through the filter; the filter element having a top end and a base end and being removably attached in fluid-tight relation at the top end to the filter housing; a weir spaced from and downstream of the filter element, compelling filtered fluid from the filter flowing towards the outlet to proceed upwardly through the space between the weir and the filter and then by overflow across the weir; and a weir follower operatively associated with the base of the filter element and movable along the weir in fluid-tight relation to the base and the weir, to carry filtered fluid in the space between the weir and the filter element on the downstream side of the filter element to the top of the weir while a used filter element is being removed, and to displace unfiltered fluid in the filter chamber from contact with the downstream side of a clean filter element while the clean filter element is being installed.*

*18. A filter assembly according to claim 17, in which the weir follower is removably attached to one end of the filter element and is slidably mounted on the weir in a manner to be retained thereon while a used filter element is being removed, and while a clean filter element is being installed.*

*19. A filter assembly according to claim 18, in which the filter element is cylindrical with end caps, and the weir follower is removably attached to one end cap.*

*20. A filter assembly according to claim 17, in which the weir follower is removably attached to the weir and fixed to the filter element in a manner to be retained thereon while a used filter element is being removed, and while a clean filter element is being installed.*

*21. A filter assembly according to claim 20, in which the filter element is cylindrical with end caps, and a weir follower is fixed to each end cap.*

*22. A filter assembly according to claim 17, in which the filter element is tubular with an open center and end caps having central apertures, and the weir and the weir follower are disposed concentrically within the open center of the filter element tube.*

*23. A filter assembly according to claim 22, in which the top of the weir extends high enough and the filter chamber volume below the top of the weir is large enough that the top of the weir is above the level of unfiltered fluid remaining in the filter chamber after the filter element has been removed, so that the unfiltered fluid left behind in the chamber does not flow over the top of the weir into the outlet for filtered fluid.*

*24. A filter assembly according to claim 22, in which the filter housing has a projection extending into the filter chamber above the weir, extending into and sealing off one end of the filter element at the end cap, with the weir follower sealing off the other end of the filter element at the other end cap.*

*25. A filter assembly according to claim 17, in which the weir is an upstanding wall defining an inner wall of the filter chamber on the downstream side of the filter element with access to the outlet for filtered fluid being by overflow across the top of the weir.*

*26. A filter assembly according to claim 25, in which the filter element is tubular with an open center and end caps having central apertures, and the weir is a baffle disposed concentrically within the filter element upstream of the filtered fluid outlet of the housing for filtered flow in the direction from the outside of the filter element towards the inside.*

*27. A filter assembly according to claim 17, in which the filter element is tubular and the weir is a central standpipe for flow in the direction from the outside of the filter element towards the inside.*

*28. A filter assembly according to claim 17, in which the filter element is tubular with an open center and end caps having central apertures and the weir follower is an annulus projecting inwardly from an end cap, slidable along the outside of the weir, having a recess facing the weir outside,*

*capturing a sealing element in the recess, and sealing against the outside of the weir at the sealing element.*

*29. A filter assembly according to claim 17, in which the filter element is tubular with an open center and end caps having central apertures and the weir follower is an annulus projecting outwardly from the weir, slidable along the outside of the weir, having a recess facing the filter element end cap, capturing a sealing element in the recess, and removably sealing against the filter element end cap, and sliding with the filter element to the top of the weir when the filter element is being removed, and to the bottom of the weir when the filter element is being installed.*

*30. A filter assembly according to claim 29, having a detent at the top of the weir, to engage and retain the weir follower upon removal of the used filter element, the detent being releasable after installation of a fresh filter element, to permit the weir follower to proceed with the filter element down the weir to the operating position.*

*31. A tank for storage of filtered fluid having a feed outlet line and a return inlet line for circulation of fluid to and from the tank, and, disposed in the return line upstream of the tank, a filter assembly according to claim 17.*

*32. A tank according to claim 31, in which the filter assembly has a port for entry of fluid for replenishing fluid in the tank, and filtering such fluid before entry into the tank.*

* * * * *